I. KAHN.
Eye-Glasses.
No. 165,589.  Patented July 13, 1875.
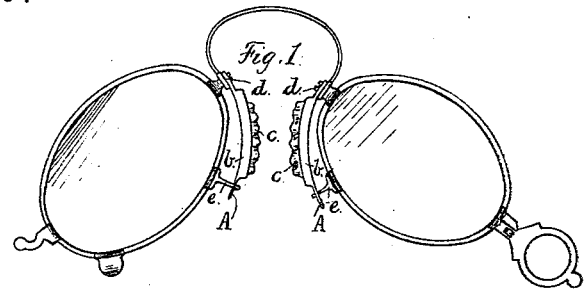
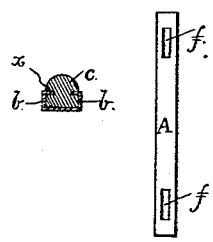
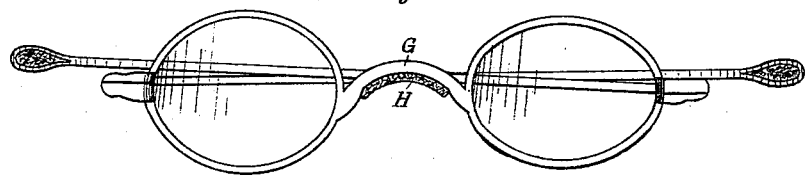
Witnesses
Geo. T. Smallwood Jr.
John Rixey Jr.
Inventor
Israel Kahn,
By John J. Halsted
his Atty.

UNITED STATES PATENT OFFICE.

ISRAEL KAHN, OF ST. JOSEPH, MISSOURI.

IMPROVEMENT IN EYEGLASSES.

Specification forming part of Letters Patent No. 165,589, dated July 13, 1875; application filed May 7, 1875.

*To all whom it may concern:*

Be it known that I, ISRAEL KAHN, of the city of St. Joseph, county of Buchanan and State of Missouri, have invented new and useful Improvements in Eyeglasses; and I do hereby declare that the following, taken in connection with the drawings which accompany and form part of this specification, is a description of my invention sufficient to enable those skilled in the art to practice it.

My improvements relate to devices for causing that part of spectacles or eyeglasses which comes in contact with the flesh of the wearer to fit easily and comfortably, without squeezing, chafing, or irritating; and they consist in a special construction of different parts, as hereinafter set forth, in connection with inserted pads of soft rubber.

In the drawings, Figure 1 illustrates a pair of eyeglasses, and Fig. 2 a pair of spectacles made in accordance with my invention. The other figures show parts detached.

The springs A A of the eyeglasses are each made with side pieces or flanges $b$ $b$, the whole forming a sort of open box or groove adapted to receive a pad or strip, $c$, of soft rubber, which may be slipped in or pressed into the groove, the rubber being of sufficient thickness to project above the edges of the flanges, and capable of holding its position by its own resilience, the box or cavity being such as to hold the strip of rubber tightly enough for all practical purposes by the mere form of the cavity itself; and this is best effected by having the upper edges of the flanges turn a little inward or toward each other, as shown at $x$, Fig. 3, which is an enlarged view, so that the mouth of the cavity is of less breadth than the cavity itself. The rubber pad is thus securely held when once pressed to place, no rivets or metal clamps or cement being needed to hold the rubber to the spring, and no metal or rigid metal coming in contact with and pinching the flesh.

The rubber may be molded with longitudinal grooves $y$ on two opposite sides, the grooves being designed to receive the above-described turned edges of the flanges. The grooves may be of dovetailed form, as also the rubber, and serve the same purpose of holding the rubber pad tightly. The rubber may have its outer face, which comes in contact with the flesh, slightly corrugated or roughened. Long strips of rubber, as shown in enlarged view in Fig. 5, adapted for the purpose of my improvements, may be made economically, and then cut without a particle of waste into short strips of the length desired, and these can be instantly inserted in their place in the springs by any unskilled person, and without the need of any special tool for the purpose.

The springs A are made self-adjusting in a direction to and from the frame of the glass, being firmly secured only at their upper ends, as seen at $d$, and in their normal position their lower free ends stand off from the frame and toward each other; but they are prevented from accidental lateral sway or movement by the pins $e$ on the frame, and which enter longitudinal slots $f$ in the springs.

It will thus be seen that by my construction I get not only the yield due to the soft rubber, but also all the resilience due to the spring.

A longitudinal slot at that end of the spring A which is screwed to the frame permits the shifting of the spring and its soft rubber farther up or down, and this affords still another means for adapting the glasses to noses of different forms or thicknesses.

In the spectacles the bridge G is flanged on the under side, as shown in Fig. 4, and the soft-rubber strip or nose-piece H is slipped into and held in the groove in the same manner as above described.

The tips of the bows of the spectacles are also flanged or cupped in substantially the same manner, and a piece of soft rubber pressed and secured therein, as seen in Fig. 6.

As all the weight of the spectacles is borne by the bridge of the nose, this soft elastic rubber pad proves a great relief, preventing the contact and pressure of hard metal upon the flesh, and softening and easing the pressure; and the elastic quality of the pads upon the bows also gives a more comfortable hold upon the temples of the wearer, and also a firmer hold with less liability to slip.

I do not claim nose-springs for eyeglasses hung thereon so as to be free to play at their lower ends.

I claim—

1. In combination with the box-springs A, constructed as described, and free to play at their lower ends, the soft-rubber pads or strips c, applied thereto and held thereby, in the manner set forth.

2. The soft-rubber pads applied to, and held by their own resilience within, cavities or boxes made in the bridge or bows of a pair of spectacles, and projecting beyond the surface of the metal, all as shown and set forth.

ISRAEL KAHN.

Witnesses:
G. H. KOCH,
J. T. BALDWIN.